United States Patent
Tristan et al.

(10) Patent No.: US 9,767,416 B2
(45) Date of Patent: Sep. 19, 2017

(54) SPARSE AND DATA-PARALLEL INFERENCE METHOD AND SYSTEM FOR THE LATENT DIRICHLET ALLOCATION MODEL

(71) Applicant: Oracle International Corporation, Redwood Shores, CA (US)

(72) Inventors: Jean-Baptiste Tristan, Lexington, MA (US); Guy L. Steele, Jr., Lexington, MA (US); Joseph Tassarotti, Pittsburgh, PA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/755,312

(22) Filed: Jun. 30, 2015

(65) Prior Publication Data
US 2016/0224544 A1    Aug. 4, 2016

Related U.S. Application Data

(60) Provisional application No. 62/112,007, filed on Feb. 4, 2015.

(51) Int. Cl.
*G06F 17/17* (2006.01)
*G06F 17/20* (2006.01)
(Continued)

(52) U.S. Cl.
CPC .......... *G06N 7/005* (2013.01); *G06F 9/5066* (2013.01); *G06F 17/277* (2013.01); *G06F 17/2785* (2013.01); *G06F 17/3071* (2013.01)

(58) Field of Classification Search
None
See application file for complete search history.

(56) References Cited

U.S. PATENT DOCUMENTS

| | | | |
|---|---|---|---|
| 2014/0149433 A1* | 5/2014 | Lakshminarayan | G06F 17/30306 707/750 |
| 2015/0095277 A1* | 4/2015 | Tristan | G06N 7/005 706/52 |

(Continued)

OTHER PUBLICATIONS

Goodman et al., "Church: A Language for Generative Models", In Proceedings of the 24th Conference on Uncertainty in Artificial Intelligence, UAI 2008, pp. 220-229, dated 2008, 10 pages.

(Continued)

*Primary Examiner* — Marcus T Riley
(74) *Attorney, Agent, or Firm* — Hickman Palermo Becker Bingham LLP

(57) ABSTRACT

Herein is described a data-parallel and sparse algorithm for topic modeling. This algorithm is based on a highly parallel algorithm for a Greedy Gibbs sampler. The Greedy Gibbs sampler is a Markov-Chain Monte Carlo algorithm that estimates topics, in an unsupervised fashion, by estimating the parameters of the topic model Latent Dirichlet Allocation (LDA). The Greedy Gibbs sampler is a data-parallel algorithm for topic modeling, and is configured to be implemented on a highly-parallel architecture, such as a GPU. The Greedy Gibbs sampler is modified to take advantage of data sparsity while maintaining the parallelism. Furthermore, in an embodiment, implementation of the Greedy Gibbs sampler uses both densely-represented and sparsely-represented matrices to reduce the amount of computation while maintaining fast accesses to memory for implementation on a GPU.

24 Claims, 11 Drawing Sheets

(51) Int. Cl.
  *G06N 7/00* (2006.01)
  *G06F 9/50* (2006.01)
  *G06F 17/27* (2006.01)
  *G06F 17/30* (2006.01)

(56) References Cited

U.S. PATENT DOCUMENTS

| | | | |
|---|---|---|---|
| 2016/0210718 A1* | 7/2016 | Tristan | G06K 9/00 |
| 2016/0224544 A1* | 8/2016 | Tristan | G06F 9/5066 |
| 2016/0224900 A1 | 8/2016 | Steele, Jr. | |
| 2016/0224902 A1 | 8/2016 | Steele, Jr. et al. | |
| 2016/0350411 A1* | 12/2016 | Tristan | G06F 17/30707 |
| 2017/0039265 A1* | 2/2017 | Steele, Jr. | G06F 17/2705 |

OTHER PUBLICATIONS

Liu et al., "PLDA+:Parallel Latent Dirichlet Allocation with Data Placement and Pipeline Processing", ACM, dated 2011, 18 pages.
Kruschke, John. Doing Bayesian Data Analysis: A Tutorial Introduction with R . Academic Press, 2010.
Koller, D., McAllester, D., and Pfeffer, A., "Effective Bayesian Inference for Stochastic Programs". In Proceedings of the 14th National Conference on Artificial Intelligence, dated 1997, 8 pages.
Jiang et al., "A Method of Accelerating LDA Program with GPU", 2012 Third International Conference on Networking and Distributed Computing IEEE, 2012, 4 pages.
Hoffman, M., Blei, D., Wang, C., and Paisley, J. "Stochastic Variational Inference", Journal of Machine Learning Research , 14:1303-1347, dated 2013, 45 pages.
Hoffman, M. D. and Gelman, A., "The No-U-turn Sampler: Adaptively Setting Path Lengths in Hamiltonian Monte Carlo", Journal of Machine Learning Research , In press., dated Apr. 2014, 31 pages.
Hillis,W. D. and Steele, Jr., G. L., "Data Parallel Algorithms", Communications of the ACM , 29(12):1170-1183, 1986, 14 pages.
Hershey et al., "Accelerating inference:Towards a Full Language,", compiler and hardwarestack. CoRR , abs/1212.2991, 2012, 8 pages.
Kiselyov, O. and Shan, C.-C. "Embedded Probabilistic Programming", In Proceedings of the IFIP TC 2 Working Conference on Domain-Specific Languages , 2009, pp. 360-384. Springer-Verlag, 25 pages.
Goodman, N. D. "The Principles and Practice of Probabilistic Programming"., Proceedings of the 40th annual ACM SIGPLAN-SIGACT Symposium on Principles of Programming Languages, dated 2013, 3 pgs.
Marsaglia, G. and Tsang, W. W. A simple method for generating gamma variables. ACM Trans. Math. Softw. , 26 (3):363-372, 2000.
Freitas et al., "Bayesian Latent Semantic Analysis of Multimedia Databases" Technical Report, dated Oct. 22, 2001, 36 pages.
Chang et al., "Reading Tea Leaves: How Humans Interpret Topic Models" dated 2009, 9 pages.
Celeux et al., "On Stochastic Versions of the EM Algorithm", INRIA, dated Mar. 1995, 25 pages.
Blelloch, G. E. "Programming Parallel Algorithms". Communications of the ACM, 39:85-97, 1996, 13 pages.
Blei et al., "Latent Dirichlet Allocation" Journal of Machine Learning Research 3, dated 2003, 30 pages.
Bache, K. and Lichman, M. "UCI Machine Learning Repository", 2013. URL http://archive.ics.uci.edu/ml, 2 pages.
Asuncion et al., "On Smoothing and Inference for Topic Models", UAI 2009, 8 pages.
Lunn, D., Spiegelhalter, D., Thomas, A., and Best, N. "The BUGS Project: Evolution, Critique and Future Directions", Statistics in Medicine , 2009, 19 pages.
Griffiths, T. L. and Steyvers, M. "Finding Scientific Topics". In Proceedings of the National Academy of Sciences of the United States of America , vol. 101, 2004, 8 pages.
Porteous et al., "Fast Collapsed Gibbs Sampling for Latent Dirichlet Allocation" KDD' dated 2008, ACM, 9 pages.
Yao et al., "A. Efficient Methods for Topic Model Inference on Streaming Document Collections", 15th ACM SIGKDD International Conference on Knowledge Discovery and Data Mining, AMC, 2009, 9 pages.
Yan et al., "Parallel Inference for Latent Dirichlet Allocation on Graphics Processing Units" dated 2009, 9 pages.
Wang et al., "PLDA: Parallel Latent Dirichlet Allocation for Large-Scale Applications" AAIM, dated 2009, 14 pages.
Wallach et al., "Rethinking LDA: Why Priors Matter" dated 2009, 9 pages.
Wallach et al., "Evaluation Methods for Topic Models" Proceedings of 26th International Conference on Machine Learning Monteral, Canada, dated 2009, 8 pages.
Venugopal, D. and Gogate, V. "Dynamic Blocking and Collapsing for Gibbs Sampling", In 29th Conference on Uncertainty in Artificial Intelligence , UAI'13, 2013, 10 pages.
Thomas, A., Spiegelhalter, D. J., and Gilks, W. R. "BUGS: A Program to Perform Bayesian Inference Using Gibbs Sampling". Bayesian Statistics, 4:837 -842, dated 1992, Oxford University Press.
Stucki, S., Amin, N., Jonnalageda, M., and Rompf, T., "What are the Odds?" Probabilistic programming in Scala. In Scala '13 , pp. 360-384. Springer-Verlag, 2013, 9 pages.
Low et al., "A New Framework for Parallel Machine Learning", CoRR , abs/1006.4990, dated 2010, 10 pages.
Rosen-Zvi et al., "Learning Author-Topic Models from Text Corpora", 2004 Uncertainty in AI Conference and the 2004 ACM SIGKDD Conference, dated 2010, AMC, 38 pages.
Lu et al., "Accelerating Topic Training on a Single Machine", APWeb dated 2013, 12 pages.
Plummer, Martyn. Jags: "A Program for Analysis of Bayesian Graphical Models Using Gibbs Sampling", Pro. of the 3rd International Workshop on Distributed Statistical Computing, Mar. 2013, 10 pgs.
Pfeffer, A. Figaro: "An Object-Oriented Probabilistic Programming Language", Technical report, Charles River Analytics, dated 2009, 9 pages.
Pfeffer, A. "The Design and Implementation of IBAL: A General-Purpose Probabilistic Language", Introduction to Statistical Relational Learning , pp. 399-433, 2007, 45 pages.
Pfeffer, A. "Creating and Manipulating Probabilistic Programs With Figaro", In 2nd International Workshop on Statistical Relational AI , 2012, 10 pages.
Newman et al., "Distributed Algorithms for Topic Models", Journal of Machine Learning Research, dated 2009, 28 pages.
Neal, Radford. "CSC 2541: Bayesian Methods for Machine Learning", 2013. Lecture 3, 20 pages.
Minka, T., Winn, J.M., Guiver, J.P., and Knowles, D.A. "Infer.NET 2.5", 2012. URL http://research.microsoft.com/infernet . Microsoft Research Cambridge, 4 pages.
McCallum et al. "Probabilistic Programming Via Imperatively Defined Factorgraphs in Advances in Neural Information Processing Systems 22" , pp. 1249-1257, 2009, 9 pages.
Yao et al., "Efficient Methods for Topic Model Inference on Streaming Document Collections", KDD, dated 2009, ACM, 9 pages.
Smola et al., "An Architecture for Parallel Topic Models" Proceedings of the VLDB Endowment, vol. 3, No. 1, dated 2010, 8 pages.
Morris, Robert, "Counting Large Numbers of Events in Small Registers", Programming Techniques, AMC, dated Oct. 1978, 3 pages.
Blei et al., "Latent Dirichlet Allocation", Journal of Machine Learning Research 3 (2003) 993-1022, Submitted Feb. 2002; Published Jan. 2003, 30 pages.
D. A. Dawson, "Synchronous and Asynchronous Reversible Markov Systems", Canad. Math. Bull. vol. 17 (5), 1975, 17 pages.
D.P. Landau et al., "Test of parallel updating in Ising model simulation", HAL Id: jpa-00210932, Submitted on Jan. 1, 1989, 5 pages.
Griffiths, Thomas, "Finding scientific topics", Colloquium, PNAS, vol. 101, dated Apr. 6, 2004, 8 pages.

(56) References Cited

OTHER PUBLICATIONS

Lebowitz et al., "Statistical Mechanics of Probabilistic Cellular Automata", Journal of Statistical Physics, vol. 59, Nos. 1/2, 1990, 54 pages.
Li et al., "Reducing the Sampling Complexity of Topic Models", ACM, dated Aug. 2014, 10 pages.
A. U. Neumann et al., "Finite size scaling study of dynamical phase transitions in two dimensional models : Ferromagnet, symmetric and non symmetric spin glasses", J. Phys. France 49 (1988), 10 pages.
Miklos, Csuros, "Approximate counting with a oating-point counter", dated 2010, 16 pages.
Yee Whye The et al, "A Collapsed Variational Bayesian Inference Algorithm for Latent Dirichlet Allocation", dated 2007, 8 pages.
Pierre-Yves Louis, "Automates Cellulaires Probabilistes : mesures stationnaires, mesures de Gibbs associees et ergodicite", HAL Id: tel-00002203, Submitted on Dec. 26, 2002, 207 pages.
Rauch, Eric, "Discrete, amorphous physical models", for a special issue on the Digital Perspectives workshop, dated Jul. 2001, 22 pages.
Tristan et al., "Efficient Training of LDA on a GPU by Mean-for-Mode Estimation", Proceedings of the 32 nd International Conference on Machine Learning, Lille, France, 2015, 10 pages.
Tristan et al., "Learning Topics with Stochastic Cellular Automata Dynamics", 9 pages.
Vichniac, Grrard Y., "Simulating Physics With Cellular Automata", North-Holland, Amsterdam, Elsevier Science Publishers B.V., dated 1984, 21 pages.
Walker, Alastair J., "An Efficient Method for Generating Discrete Random Variables With General Distributions", dated 1977, 4 pages.
Wikipedia the free encyclopedia, "alias method", https://en.wikipedia.org/wiki/Alias_method, last viewed on Sep. 24, 2015, 2 pages.
Mairesse et al., "Accepted Manuscript", Around probabilistic cellular automata, Theoretical Computer Science, dated Sep. 29, 2014, 48 pages.
Marsaglia, G. and Tsang, W. W. A simple method for generating gamma variables. ACM Trans. Math. Softw., 26 (3):363-372, 2000.
Thomas, A., Spiegelhalter, D. J., and Gilks, W. R. "BUGS: A Program to Perform Bayesian Inference Using Gibbs Sampling". Bayesian Statistics, 4:837-842, dated 1992, Oxford University Press, 4 pages.

\* cited by examiner

FIG. 2

$$p(w, z, \theta, \phi | \alpha, \beta) = \left[ \prod_{i=1}^{M} \prod_{j=1}^{N_i} \text{Cat}(w_{ij}|\phi_{z_{ij}}) \, \text{Cat}(z_{ij}|\theta_i) \right] \left[ \prod_{i=1}^{M} \text{Dir}(\theta_i|\alpha) \right] \left[ \prod_{i=1}^{K} \text{Dir}(\phi_i|\beta) \right]$$

← 200

- $M$: number of documents
- $N_i$: number of words in document $i$
- $K$: number of topics
- $V$: number of words in the vocabulary
- $\alpha$: parameter of the prior for distribution of topics per document
- $\beta$: parameter of the prior for distribution of words per topic
- $\theta_i$: distribution of topics in document $i$
- $\phi_i$: distribution of words in topic $i$
- $w_{ij}$: word number $j$ in document $i$
- $z_{ij}$: topic assignment for $w_{ij}$

← 210

TABLE OF SYMBOLS USED TO SPECIFY THE LDA MODEL

302
RECEIVE INFORMATION FOR A SET OF DOCUMENTS; WHEREIN THE SET OF DOCUMENTS COMPRISES A PLURALITY OF WORDS; AND WHEREIN A PARTICULAR DOCUMENT OF THE SET OF DOCUMENTS COMPRISES A PARTICULAR WORD OF THE PLURALITY OF WORDS

304
RUN A GREEDY GIBBS SAMPLER OVER A DIRICHLET DISTRIBUTION OF THE PLURALITY OF WORDS

306
COMPUTE PROBABILITIES OF ONE OR MORE TOPICS, OF A PLURALITY OF TOPICS, FOR THE PARTICULAR WORD IN THE PARTICULAR DOCUMENT BASED, AT LEAST IN PART, ON A PROBABILITY MASS FOR ONE OF: HYPERPARAMETERS, THE PARTICULAR DOCUMENT, OR THE PARTICULAR WORD

308
DETERMINE, FROM RESULTS OF RUNNING THE GREEDY GIBBS SAMPLER OVER THE DIRICHLET DISTRIBUTION, ONE OR MORE SETS OF CORRELATED WORDS; WHEREIN THE ONE OR MORE SETS OF CORRELATED WORDS COMPRISES WORDS FROM THE PLURALITY OF WORDS

FIG. 4

Algorithm: High-level description of a Gibbs sampler for a model with random variables $X_1, ..., X_N$. $p(X_i)$ refers to the distribution of $X_i$. The result of sampling from $p(X_i)$ is stored in $X[i]$. T is the number of samples.

```
Randomly initialize array X of size N
for t = 1 to T
    X[1] = sample from p(X_1 |        X[2], X[3], ..., X[N-1], X[N])
    X[2] = sample from p(X_2 | X[1],        X[3], ..., X[N-1], X[N])
    X[3] = sample from p(X_3 | X[1], X[2],        ..., X[N-1], X[N])
    ...
    X[N] = sample from p(X_N | X[1], X[2], X[3], ..., X[N-1],       )
return X
```

$$p(z, w | \alpha, \beta) = \int_\theta \int_\phi p(w, z, \theta, \phi | \alpha, \beta) d\phi d\theta$$

$$= \left[ \prod_{i=1}^{M} \frac{\Gamma(\sum_{k=1}^{K} \alpha_k)}{\prod_{k=1}^{K} \Gamma(\alpha_k)} \frac{\prod_{k=1}^{K} \Gamma(D_{ik} + \alpha_k)}{\Gamma(\sum_{k=1}^{K} D_{ik} + \alpha_k)} \right] \left[ \prod_{i=1}^{K} \frac{\Gamma(\sum_{v=1}^{V} \beta_v)}{\prod_{v=1}^{V} \Gamma(\beta_v)} \frac{\prod_{v=1}^{V} \Gamma(W_{ik} + \beta_v)}{\Gamma(\sum_{v=1}^{V} W_{iv} + \beta_v)} \right]$$

← 500

---
Algorithm: Equations for the collapsed Gibbs sampler $$p(z_{ij} | z^{-ij}, \alpha, \beta) \propto (D_{kj}^{-z_{ij}} + \alpha_k) \frac{W_{w_{ij},k}^{-z_{ij}} + \beta_{w_{ij}}}{\sum_{v=1}^{V} W_{kv} + \beta_v}$$

$$p(\theta_i | w, z, \theta_{-i}, \phi, \alpha, \beta) \propto \text{Dir}(\theta_i | \alpha) \prod_{j=1}^{N_i} \text{Cat}(z_{ij} | \theta_i) \quad \text{—600}$$

$$\propto \text{Dir}(\theta_i | (D_{ik} + \alpha_k : k \in [1..K])) \quad \text{—610}$$

$$p(\phi_k | w, z, \theta, \phi_{-k}, \alpha, \beta) \propto \text{Dir}(\phi_k | \beta) \left[ \prod_{i=1}^{M} \prod_{j=1}^{N_i} \text{Cat}(w_{ij} | \phi_{z_{ij}})^{\mathbb{1}(z_{ij}=k)} \right] \quad \text{—620}$$

$$= \text{Dir}(\phi_k | \beta) \prod_{v=1}^{V} \phi_{kv}^{W_{vk}} \quad \text{—630}$$

$$\propto \text{Dir}(\phi_k | (W_{vk} + \beta_v : v \in [1..V])) \quad \text{—640}$$

---

Algorithm: Gibbs sampler $$p(\phi_k | w, z, \theta, \phi_{-k}, \alpha, \beta) \propto \text{Dir}(\phi_k | (W_{vk} + \beta_v : v \in [1..V])) \quad \text{—652}$$

$$p(\theta_i | w, z, \theta_{-i}, \phi, \alpha, \beta) \propto \text{Dir}(\theta_i | (D_{ik} + \alpha_k : k \in [1..K])) \quad \text{—654}$$

$$p(z_{ij} = t | w, z_{-ij}, \theta, \phi, \alpha, \beta) \propto \text{Cat}(w_{ij} | \phi_{z_{ij}}) \text{Cat}(z_t | \theta_i) \quad \text{—656}$$

---

650

FIG. 7

Algorithm: Greedy Gibbs sampler $$p(\theta_{mk}|w, z, \theta_{-m}, \alpha, \beta) \propto \mathcal{D}_{mk} + \alpha_m \quad \text{— 702}$$

$$p(\phi_{kv}|w, z, \phi_{-k}, \alpha, \beta) \propto \frac{W_{vk} + \beta_v}{\sum_{v=1}^{V} W_{kv} + \beta_v} \quad \text{— 704}$$

$$p_t(z_{ij} = t|z_{-ij}, \phi, w, \alpha, \beta) \propto \text{Cat}(z_t|\theta_t)\,\text{Cat}(w_{ij}|\phi_{z_t}) \quad \text{— 706}$$

$$p(z_{ij} = t | w_{ij} = v) \propto (D_{mt} + \alpha) \frac{W_{vt} + \beta}{\sum_{v=1}^{V} W_{vt} + \beta}$$

← 800

$$p(z_{ij} = t | w_{ij} = v) \propto \frac{\alpha \beta}{\sum_{v=1}^{V} W_{vt} + \beta} + \frac{D_{mt} \beta}{\sum_{v=1}^{V} W_{vt} + \beta} + \frac{(\alpha + D_{mt}) W_{vt}}{\sum_{v=1}^{V} W_{vt} + \beta}$$

← 810

$$s = \sum_{t=0}^{K} \frac{\alpha \beta}{\sum_{v=1}^{V} W_{vt} + \beta}$$ — 820

$$r = \sum_{t=0}^{K} \frac{D_{mt} \beta}{\sum_{v=1}^{V} W_{vt} + \beta}$$ — 830

$$q = \sum_{t=0}^{K} \frac{(\alpha + D_{mt}) W_{vt}}{\sum_{v=1}^{V} W_{vt} + \beta}$$ — 840

902
RECEIVE INFORMATION FOR A SET OF DOCUMENTS; WHEREIN THE SET OF DOCUMENTS COMPRISES A PLURALITY OF WORDS; AND WHEREIN A PARTICULAR DOCUMENT OF THE SET OF DOCUMENTS COMPRISES A PARTICULAR WORD OF THE PLURALITY OF WORDS

904
RUN A GREEDY GIBBS SAMPLER OVER A DIRICHLET DISTRIBUTION OF THE PLURALITY OF WORDS

906
COMPUTE PROBABILITIES OF ONE OR MORE TOPICS, OF A PLURALITY OF TOPICS, ASSIGNED TO THE PARTICULAR WORD IN THE PARTICULAR DOCUMENT BASED, AT LEAST IN PART, ON BOTH OF: (A) ONE OR MORE DENSELY-REPRESENTED MATRICES, AND (B) ONE OR MORE SPARSELY-REPRESENTED MATRICES

908
DETERMINE, FROM RESULTS OF RUNNING THE GREEDY GIBBS SAMPLER OVER THE DIRICHLET DISTRIBUTION, ONE OR MORE SETS OF CORRELATED WORDS; WHEREIN THE ONE OR MORE SETS OF CORRELATED WORDS COMPRISES WORDS FROM THE PLURALITY OF WORDS

1000

SPARSE AND DATA-PARALLEL INFERENCE METHOD AND SYSTEM FOR THE LATENT DIRICHLET ALLOCATION MODEL

BENEFIT CLAIM; CROSS-REFERENCE TO RELATED APPLICATIONS

This application claims the benefit of Provisional Appln. 62/112,007, filed Feb. 4, 2015, the entire contents of which is hereby incorporated by reference as if fully set forth herein, under 35 U.S.C. §119(e).

This application is related to application Ser. No. 14/599,272, titled "DATA-PARALLEL PARAMETER ESTIMATION OF THE LATENT DIRICHLET ALLOCATION MODEL BY GREEDY GIBBS SAMPLING", filed Jan. 16, 2015, the entire contents of which is hereby incorporated by reference as if fully set forth herein.

FIELD OF THE INVENTION

The present invention relates to automatic and unsupervised discovery of topics in unlabeled data, and, more specifically, to taking advantage of sparsity to reduce computations for a Greedy Gibbs sampler that identifies topics for words from the unlabeled data and to configuring the Greedy Gibbs sampler to effectively run on highly parallel architectures.

BACKGROUND

The automatic and unsupervised discovery of topics in unlabeled data may be used to improve the performance of various kinds of classifiers (such as sentiment analysis) and natural language processing applications. Being unsupervised is both a blessing and a curse. It is a blessing because good labeled data is a scarce resource, so improving tools that depend on labeled data by extracting knowledge from the vast amounts of unlabeled data is very useful. It is a curse because the methods used to discover topics are generally computationally intensive.

A topic model—which is a probabilistic model for unlabeled data—may be used for the automatic and unsupervised discovery of topics in unlabeled data, such as a set of textual documents. Such a topic model is designed with the underlying assumption that words belong to sets of topics, where a topic is a set of words. For example, given a set of scientific papers, a topic model can be used to discover words that occur together (and therefore form a topic). One topic could include words such as "neuroscience" and "synapse", while another topic could include words such as "graviton" and "boson".

Topic models have many applications in natural language processing. For example, topic modeling can be a key part of text analytics such as Name Entity Recognition, Part-of-Speech Tagging, retrieval of information for search engines, etc. Unfortunately, topic modeling is generally computationally expensive, and it often needs to be applied on significant amounts of data, sometimes under time constraints.

Some prior industry solutions are based on running a so-called collapsed Gibbs sampler on a statistical model called Latent Dirichlet Allocation (LDA). This algorithm is inherently sequential. Distributed and parallel solutions based on the collapsed Gibbs sampler are generally created by approximating the algorithm; however, this only works for coarse-grained parallel architectures, and fails to make use of highly data-parallel architectures such as Graphics Processor Units (GPUs).

The latest editions of GPUs have considerable computational potential, with even more potential for computational power. However, running topic modeling tasks on a GPU is challenging because GPUs expose a computational model that is very different from ordinary CPUs (e.g., processors and multicores). As such, algorithms that work well on ordinary CPUs need to be re-designed to be data-parallel for GPUs.

The lack of parallelism in implementations of the Gibbs sampler is often compensated by taking advantage of sparsity of the data. Specifically, a key characteristic of algorithms for topic modeling is that the matrices used to compute topic, word, and document statistics are typically sparse. Taking advantage of data sparsity in a Gibbs sampler allows such an algorithm to process data quickly, notwithstanding the lack of parallelism in the algorithm.

It would be beneficial to implement a topic modeling algorithm that is both highly data-parallel and takes advantage of data sparsity in order to more efficiently create topic models.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts a density function that describes a Latent Dirichlet Allocation model.

FIG. 3 depicts a flowchart for identifying sets of correlated words from a given set of documents.

FIG. 4 depicts a high-level description of a Gibbs sampler for a model with random variables.

FIG. 5 depicts a model and formulas for a Gibbs sampler.

FIG. 6 depicts a derivation of the Gibbs formulas for pristine LDA, and Gibbs sampler formulas for pristine LDA.

FIG. 7 depicts Greedy Gibbs sampler formulas.

FIG. 8 depicts formulas for sparse LDA.

FIG. 9 depicts a flowchart for running a Greedy Gibbs sampler that computes probabilities of assigning topics to words from a set of documents based on both of densely-represented matrices and sparsely-represented matrices.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is described a data-parallel and sparse algorithm for topic modeling. This algorithm is based on a highly parallel algorithm for a Greedy Gibbs sampler presented in application Ser. No. 14/599,272. The Greedy Gibbs sampler is a Markov-Chain Monte Carlo algorithm that estimates topics, in an unsupervised fashion, by estimating the parameters of the topic model Latent Dirichlet Allocation (LDA). The Greedy Gibbs sampler is a data-parallel algorithm for topic modeling, and is configured to be implemented on a highly-parallel architecture, such as a GPU.

Herein, the Greedy Gibbs sampler is modified to take advantage of data sparsity while maintaining the parallelism. Furthermore, in an embodiment, implementation of the Greedy Gibbs sampler uses both densely-represented and sparsely-represented matrices to reduce the amount of computation while maintaining fast Single Instruction, Multiple Data (SIMD) accesses to memory for implementation on a GPU.

Embodiments of the Greedy Gibbs sampler described herein significantly improve performance of topic discovery in two ways. First, embodiments allow for reduction of the amount of computation required to assign topics to words by taking advantage of sparsity in the data and also via a carefully designed layout for the data used in the sampler.

Second, because embodiments reduce the amount of memory required for the data used in the sampler, the Greedy Gibbs sampler is configured to process more data on a single GPU, which, in turn, requires less overall resources to process the data. For example, in the context of a cluster of machines implementing an embodiment of the Greedy Gibbs sampler described herein, the cluster would require less machines overall when compared to other implementations of topic modeling because of the amount of data that can be processed on a single GPU, which has the added benefit of reducing communication needs between nodes in the cluster.

Furthermore, the described Greedy Gibbs sampler facilitates processing larger datasets, and processes such data sets closer to real time, which is important in cases where streaming data requires constant topic updates to account for the streaming data. The increased capacity of the described Greedy Gibbs sampler facilitates better topic results, and therefore better classifiers, which are very common tools in data analytics.

Architecture for Sparse Model Sampling

Figure 1:
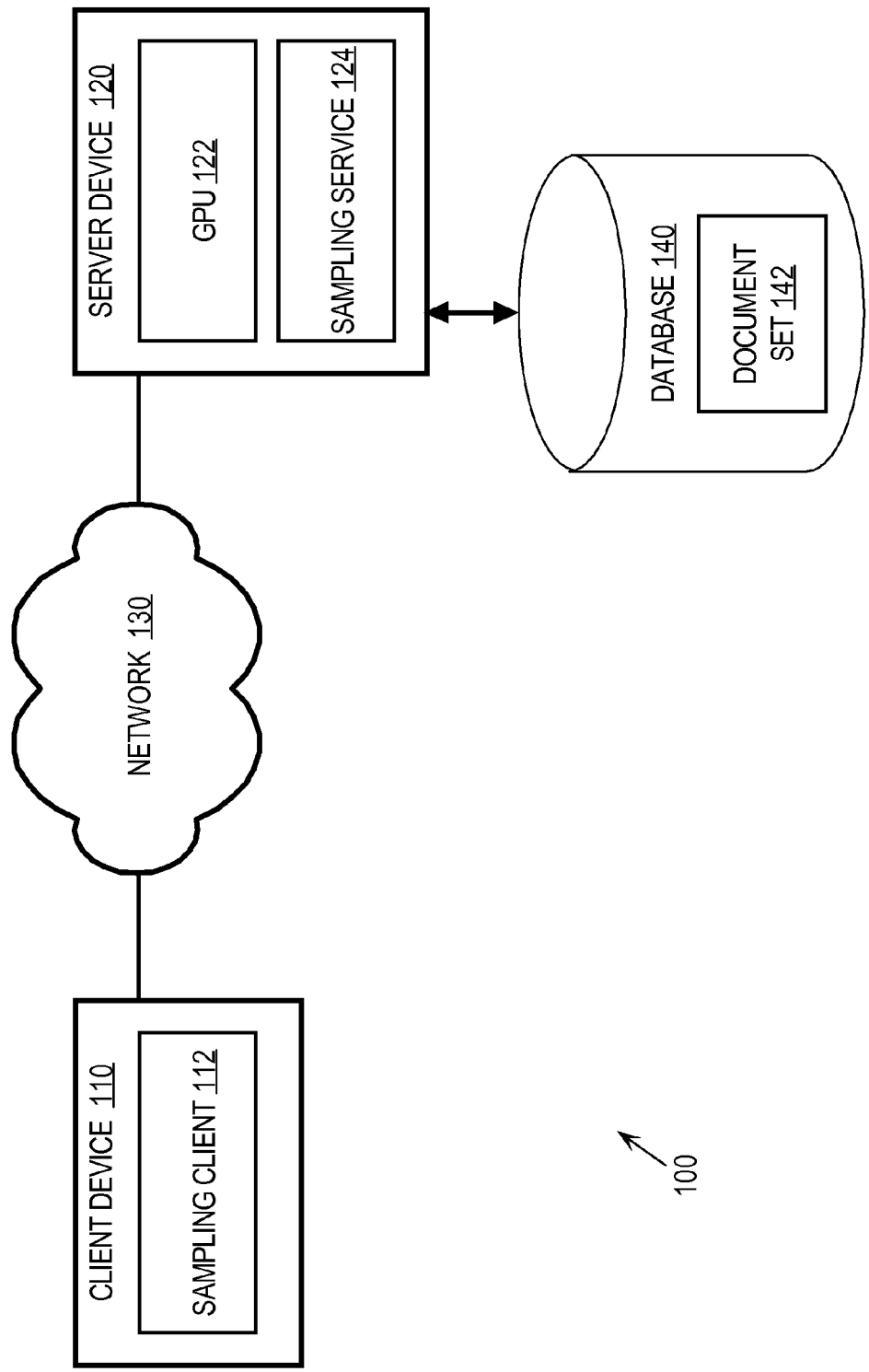
FIG. 1 is a block diagram that depicts an example network arrangement for a sparse and parallel model sampling system.

FIG. 1 is a block diagram that depicts an example network arrangement 100 for a sparse and parallel model sampling system, according to embodiments. Network arrangement 100 includes a client device 110 and a server device 120 communicatively coupled via a network 130. Example network arrangement 100 may include other devices, including client devices, server devices, cluster nodes, and display devices, according to embodiments.

Client device 110 may be implemented by any type of computing device that is communicatively connected to network 130. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a sampling client 112. Sampling client 112 may be implemented in any number of ways, including as a stand-alone application running on client device 110, as a plugin to a browser running at client device 110, etc. Sampling client 112 may be implemented by one or more logical modules. Client device 110 may be configured with other mechanisms, processes and functionalities, depending upon a particular implementation.

Network 130 may be implemented with any type of medium and/or mechanism that facilitates the exchange of information between client device 110 and server device 120. Furthermore, network 130 may facilitate use of any type of communications protocol, and may be secured or unsecured, depending upon the requirements of a particular embodiment.

Server device 120 may be implemented by any type of computing device that is capable of communicating with client device 110 over network 130. In network arrangement 100, server device 120 is configured with a GPU 122 and a sampling service 124, which is described in further detail below. Any of the functionality attributed to GPU 122 and/or sampling service 124 herein may be performed by another entity running on server device 120, or by a GPU or other entity on client device 110 or on other devices that are communicatively coupled to network 130, according to embodiments. Server device 120 may be configured with other mechanisms, hardware, processes, and functionalities, depending upon a particular implementation.

Server device 120 is communicatively coupled to database 140. Database 140 maintains information for a document set 142. Database 140 may reside in any type of storage, including volatile and non-volatile storage (e.g., random access memory (RAM), a removable or disk drive, main memory, etc.), and may be implemented by one or more logical databases. The storage on which database 140 resides may be external or internal to server device 120.

Sampling client 112 and/or sampling service 124 may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication, e.g., from other entities communicatively coupled to network 130. Further, sampling client 112 and/or sampling service 124 may send one or more communications, using any of the above protocols or any other communication protocol, over network 130 to other entities communicatively coupled to network 130, according to embodiments.

In an embodiment, each of the processes described in connection with sampling client 112, GPU 122, and/or sampling service 124 are performed automatically and may be implemented using one or more computer programs, other software or hardware elements, and/or digital logic in any of a general-purpose computer or a special-purpose computer, while performing data retrieval, transformation, and storage operations that involve interacting with and transforming the physical state of memory of the computer.

Latent Dirichlet Allocation

The Latent Dirichlet Allocation model (LDA) can be described by density function 200 of FIG. 2. The variables are described in table 210 of FIG. 2. Herein is used a letter without a subscript such as θ to refer to a set of vectors of random variables $\theta_i$.

Intuitively, the model described by density function 200 describes how a corpus, represented as a vector of words w, could be randomly generated. The process works as follows.

First, to generate M documents, M distributions of topics are drawn, one per document ($\Pi_{i=1}^{M} Dir(\theta_i|\alpha)$). Such a distribution is denoted by the random variable $\theta_i$. To generate documents out of K topics, $\theta_i$ will be a vector of size K.

Second, K distributions of words are drawn, one per topic ($\Pi_{i=1}^{K} Dir(\phi_i|\beta)$). Such a distribution is denoted by the random variable $\phi_k$. Assuming our vocabulary is of size V, $\phi_k$ will be a vector of size V. Note that the random vectors $\theta_i$ and $\phi_k$ are drawn from Dirichlet distributions for mathematical convenience.

Finally, for each word in each document, a topic for the word is drawn (using $\theta_i$). Then, given this topic choice, a word is drawn (using $\phi_k$) from the corresponding topic distribution ($\Pi_{i=1}^{M} \Pi_{j=1}^{N_i}$ Cat($w_{ij}|\phi_{z_{ij}}$)Cat($z_{ij}|\theta_i$)).

A valuable application of topic modeling (rather than generating random documents) is, given a set of documents (which may be represented as a ragged array or equivalently as a flat vector of words along with an array N that gives the length of each document), estimating the probabilities of each of the $\theta_i$ and $\phi_k$ conditioned on the given data. More precisely, $\theta$ and $\phi$ are estimated in the following optimization problem:

$$\underset{\theta,\phi}{\operatorname{argmax}} p(\theta, \phi \mid w)$$

That is, values for $\theta$ and $\phi$ are found that maximize the probability of the given words. Computing the exact maximum is computationally intractable, so approximate algorithms are used to identify these values.

FIG. 3 depicts a flowchart 300 for identifying sets of correlated words from a given set of documents. At step 302, information is received for a set of documents, i.e., document set 142 (database 140), where the set of documents comprises a plurality of words, and the particular document of the set of documents comprises a particular word of the plurality of words. For example, a user provides information about document set 142 to sampling client 112 (client device 110). In this example, document set 142 is a set of web pages gathered by a web crawler. Sampling client 112 provides the information to sampling service 124 (of server device 120).

Document set 142 includes one or more documents, where each document includes words. As such, each particular document in document set 142 includes words that may be correlated by a Gibbs sampler. According to an embodiment, a user also provides sampling service 124 a number of topics (K) into which the Gibbs sampler should correlate the words from document set 142.

Herein, algorithms to solve the problem of identifying values for $\theta$ and $\phi$ are described using the following notations:

Number of occurrences of topic t in document i:

$$D_{it} = |\{z_{ij} : j \in [1 \ldots N_i], z_{ij} = t\}|$$

Number of times word v is assigned to topic t:

$$W_{vt} = |\{w_{ij} : i \in [1 \ldots M], j \in [1 \ldots N_i], w_{ij} = v, z_{ij} = t\}|$$

Number of times topic t is assigned to any word:

$$W_t = \sum_v W_{vt}$$

Gibbs Sampling

Markov Chain Monte Carlo (MCMC) algorithms are used to estimate the parameters. The idea is that even though the closed form of $p(\theta, \phi|w)$ is not known, samples can still be drawn from it, proportionally to their likelihood, and so the most likely samples that are found can be kept as estimates of $\phi$ and $\theta$. There are many ways to build algorithms to sample from $p(\theta, \phi|w)$, but for LDA it is customary to use a specific class of algorithms called Gibbs samplers.

Gibbs samplers work by drawing samples one variable at a time, as described in algorithm 400 of FIG. 4. To derive a Gibbs sampler, one must therefore be able to sample from the conditional distributions $p(X_i|$all other variables of the model) for each random variable X in the model. The definitions of these conditional distributions are referred to herein as the Gibbs equations (or formulas), and knowledge of the Gibbs equations is all that is needed to implement a Gibbs sampler using algorithm 400. Once the Gibbs sampler is used to draw from each variable of the model conditioned on the other variables, the individual samples can be combined into a sample for the entire model, and the process iterates as many times as samples are required.

A key idea to build a parallel Gibbs sampler is to note that if two variables are independent in the model, then they will not depend on each other for their corresponding Gibbs equations and they can therefore be sampled in parallel.

The samples obtained using the MCMC algorithm are specific value assignments for all the vectors $\theta_i$ and $\phi_k$, and for each sample, the quality of algorithm can be evaluated by computing some metric over these values. Typically, the first few samples that are obtained will have a very low probability because the algorithm is started with an arbitrary assignment. Consequently, further iterations of the algorithm "converge" to samples that explain the data better. There are two meaningful measures to assess the "speed" of an MCMC algorithm: the time to converge and the time to sample. Herein, notations are used as follows:

Sample: refers not to a sample from one of the conditional distributions, but rather to the sample for all variables that are obtained after a full iteration of algorithm 400.

Time to convergence: refers to the number of samples that are needed to find "good" assignments for $\theta$ and for $\phi$.

Time to sample: refers to the time it takes to draw a sample.

The tradeoffs between the time-to-convergence measure and the time-to-sample measure can be delicate. As an example, note that there is no point in speeding up the time-to-sample by two if it takes four times more samples to obtain a good assignment for $\theta$ and $\phi$.

Building a Gibbs Sampler

One way of building a Gibbs sampler for LDA is to build a collapsed Gibbs sampler. Such a sampler has a high statistical quality, but has the big disadvantage that it is a sequential algorithm. Prior research on parallel parameter estimation for LDA has been focused on parallelizing the collapsed Gibbs sampler by making approximations. However, even though such approximations work well for an architecture with coarse-grained parallelism, this technique does not lend itself to a good data-parallel algorithm for a GPU, such as GPU 122. Adapting to the GPU computational model can result in overall better algorithms.

An alternative that works well for GPU is to use a Greedy Gibbs sampler. This algorithm is derived from a non-collapsed Gibbs sampler (i.e., with at least one variable non-collapsed), which exposes a lot of parallelism and has good statistical performance (though not as good as a collapsed Gibbs sampler). Implementations of non-collapsed Gibbs samplers have historically not been able to take advantage of sparsity. Since the non-collapsed Gibbs sampler is non-deterministic, it produces few, if any, zero count values. Such inability to take advantage of sparsity (and the accompanying improved performance) greatly limits the practical utility of a non-collapsed Gibbs sampler.

The Greedy Gibbs sampler addresses the shortcomings of traditional non-collapsed Gibbs samplers, and offers both a large amount of parallelism and state-of-the-art statistical performance. Herein is described a version of a Greedy Gibbs sampler that makes use of both densely-represented and sparsely-represented matrices to reduce the amount of computation while remaining an effective GPU application.

Collapsed Gibbs Sampler

The most popular MCMC for LDA takes advantage of the fact that the integration of variables θ and φ has a closed form solution. Therefore, a model 500 of FIG. 5 is defined by integrating these variables, from which is derived a Gibbs sampler.

Gibbs equations (shown in algorithm 510 of FIG. 5) can be derived for model 500, which leads to the first presented MCMC algorithm to find parameters for LDA. A key thing to note here is that drawing a given $z_{ij}$ depends on the assignments to all the other z variables, so it is required that these variables are updated sequentially. This results from the integration. Such integration results in a model that is simpler to sample from, but this sampling has no intrinsic parallelism.

The collapsed Gibbs sampler is most commonly used because it has a very good convergence and it is possible to take advantage of sparsity of data with a collapsed Gibbs sampler. However, even though it is possible to parallelize this algorithm, the parallelization is coarse and not effective to make use of a GPU.

Normal Gibbs Sampler

If one chooses not to integrate one or both of the θ and φ variables in a Gibbs sampler, then there are more independent variables and consequently more parallelism in the Gibbs sampler. This type of Gibbs sampler is referred to herein as a normal (or non-collapsed) Gibbs sampler.

First is reviewed the derivation of the Gibbs equations for pristine LDA (with no variables collapsed) indicated in equations 600-640 and algorithm 650 of FIG. 6. The derivations for variables $\theta_i$ and $z_{ij}$ are straightforward.

Formulas 652 and 654, of algorithm 650, identify values for parameters φ and θ, respectively. These formulas represent discovery of the parameters for the given Dirichlet distributions. Formula 656 represents drawing values from the Dirichlet distributions.

The key advantage of algorithm 650 is the very large amount of parallelism it offers. However, it is known to have a worse convergence rate, and it has a worse statistical performance, than the collapsed Gibbs sampler.

Greedy Gibbs Sampler

A Greedy Gibbs sampler algorithm, which has at least one non-collapsed variable, has enough parallelism to be run on a GPU, and yet that has convergence close to the convergence of the collapsed Gibbs sampler, and a statistical performance as good as the statistical performance of the collapsed Gibbs sampler.

Algorithm 700 of FIG. 7 depicts a Greedy Gibbs sampler. The key difference between algorithm 650 and algorithm 700 is that, instead of drawing from some Dirichlet distribution d as in algorithm 650, the Greedy Gibbs sampler of algorithm 700 directly computes the mean of d. Formula 702 of FIG. 7 may be rewritten as follows:

$$\theta_{mk} = \frac{D_{mk} + \alpha_k}{N_m + \sum_{k=0}^{K} \alpha_k}$$

The right-hand side of this rewritten equation depicts computing the mean of the distribution.

Returning to flowchart 300 of FIG. 3, at step 304, a Greedy Gibbs sampler is run over a Dirichlet distribution of the plurality of words in the set of documents. For example, sampling service 124 runs a Greedy Gibbs sampler over a Dirichlet distribution of the plurality of words in document set 142.

One of the consequences of using a Greedy Gibbs sampler is that the probability computations are deterministic. Therefore, when there is a count of zero for words per topic or topics per document in a given probability calculation, it is known what the resulting probability will be, which enables making use of sparse LDA methods.

Sparse LDA

Once the drawing of probabilities is deterministic, it is possible to inline the definition of φ or θ into the drawing for the latent variables. As such, formula 800 of FIG. 8 can be decomposed as illustrated in formula 810 of FIG. 8. Accordingly, the overall non-normalized probability mass can be described as the sum of three values s, r, and q, which correspond to the probability mass of choosing a topic based on the hyperparameters (s), the document (r), or the word (q). Formulas 820-840 of FIG. 8 illustrate calculations for the values s, r, and q.

As shown in formula 820, the value of s does not take into account words per topic ($W_{vt}$) or documents per topic ($D_{mt}$). Furthermore, as shown in formula 830, the value of r is zero if $D_{mt}$ is zero. Thus, using sparsity, r need only be calculated for non-zero $D_{mt}$ values. Also, as shown in formula 840, the value of q is zero if $W_{vt}$ is zero. Therefore, using sparsity, q need only be calculated for non-zero $W_{vt}$ values. Also, the calculation of q is simplified if the value of θ for topic t is zero for the given document. Because, many times, the values of $D_{mt}$ and $W_{vt}$ are zero while running a Greedy Gibbs sampler for any given set of documents, utilizing the sparsity of these count matrices greatly reduces the amount of calculations needed to draw topic assignments.

Because the drawing of probabilities is deterministic for a Greedy Gibbs sampler, the probability masses of s, r, and q can be discovered prior to assigning topics to words. Based on the known probability masses of s, r, and q, sampling service 124 decides which of s, r, and q will be used to draw particular topic assignments.

To illustrate further, by running a non-deterministic Gibbs sampler that does not take advantage of sparsity, a service determines that the word "neuroscience" has never been assigned to a particular topic. In the non-deterministic calculations of this Gibbs sampler, the zero count of the word "neuroscience" having been assigned to the particular topic does not affect the amount of calculations required to determine a new probability of the word "neuroscience" being assigned to the particular topic. There is a persistent, if small, chance of the particular topic being assigned to the word "neuroscience" for the first time at the present draw.

Unlike the calculations attendant to running a non-deterministic Gibbs sampler, sampling service 124 running a Greedy Gibbs sampler as described herein only has a small chance of having to perform any significant calculations for assignment of the particular topic to the word "neuroscience" given a zero count for $D_{mt}$ and $W_{vt}$, and that is the chance of s being chosen to calculate the probability. If r or q is chosen to calculate the probability of assigning the particular topic to the word "neuroscience" given a zero count for $D_{mt}$ and $W_{vt}$, sampling service 124 can simply assign the probability as 0.

Returning to flowchart 300 (FIG. 3), at step 306, running a Greedy Gibbs sampler over a Dirichlet distribution of the plurality of words comprises computing probabilities of one or more topics, of a plurality of topics, for the particular word in the particular document based, at least in part, on a probability mass for one of: hyperparameters, the particular document, or the particular word. For example, to draw a topic for a particular word using a Greedy Gibbs sampler, sampling service 124 randomly determines to use one of s, r, and q to assign a topic to the particular word, as described as described herein.

Therefore, as described in further detail below, sampling service 124 uses the decomposition illustrated in FIG. 8 in an inference algorithm that requires much less computation (because the counts are mostly sparse) than algorithms that do not account for data sparsity.

Sparse and Data-Parallel Gibbs Sampler for LDA

In the following pseudocode that describes a sparse and data-parallel Greedy Gibbs sampler (which, according to embodiments, is implemented by sampling service 124), M is the number of documents, it is assumed that all documents have the same size N, K is the number of topics, and V is the size of the vocabulary. M, N, K, and V are all assumed to be strictly positive. Also, the pseudocode includes descriptions of portions thereof that are provided in comments immediately preceded by "//".

The data to be analyzed, e.g., words from document set 142, is represented in the matrix "words". The "topics" matrix, "phis" matrix, and "thetas" matrix are matrices used to store the result of sampling from the conditional distributions. The matrices "topics_per_doc", "words_per_topic", and "words_total" are used to keep track of statistics about the samples. "topics_per_doc" is a matrix storing counts of the number of times a topic was assigned to a latent variable in each document. "words_per_topic" is a matrix storing counts of the number of times a word is assigned to some topic. "words_total" is an array storing counts of how many times each topic was assigned. These matrices respectively correspond to the notations $D_{ik}$, $W_{kv}$, $W_k$.

```
// Data: M documents each containing N words
int words [M,N]
// Features: each word in the data will be assigned a topic
int topics [M,N]
// The statistic matrices, keeping counts of:
// Number of times each topic is assigned in each document
int topics_per_doc [M,K]
// Number of times each topic is assigned for each vocabulary word
int words_per_topic [K,V]
// Number of vocabulary words assigned in total to each topic
int words_total [K]
// When we perform dense drawing, we will have two matrices of probabilities:
// phi[v][k]: probability of word v in topic k
float phi[V][K]
// theta[m][k]: probability of topic k in document m
float theta [M][K]
// Everything that follows is specific to sparse drawing
// Arrays to pre -compute probabilities related to words_total
float topics_s [K]
float topics_a [K]
float topics_b [K]
float topics_ab [K]
// Sparse representation of the phi matrix
int v_ptr [V]
int v_topic_index [?]
float v_payload [?]
// Sparse representation of the theta matrix
int d_ptr [M]
int d_topic_index [?]
float d_payload [?]
float d_sums [M]
float d_payload2 [?]
```

The following portion of pseudocode includes a main function "sampler", which returns an assignment for the phi variables. The function "sampler" is a loop that repeatedly computes the values of the Greedy Gibbs sampler. Specifically, "sampler" calculates the probability of $\theta_{mk}$, as represented in equation 702 of algorithm 700, which draws on the count matrix $D_{mk}$. $\theta_{mk}$ represents the probability of seeing a particular topic k in a particular document m. Each $\theta_{mk}$ may be calculated in parallel.

"Sampler" also calculates the probability of $\phi_{kv}$, as represented in equation 704 of algorithm 700, which draws on the count matrix $W_{vk}$. $\phi_{kv}$ represents the probability of seeing a particular word v associated with a particular topic k. Each $\phi_{kv}$ may be calculated in parallel.

"Sampler" calculates the probability that the latent variable $z_{ij}$ is equal to topic t, as indicated in equation 706 and equations 800-840 of FIG. 8, which draws on the matrices that store the calculated values for $\theta$ and $\phi$. The probability for each $z_{ij}$ may be calculated in parallel. At this point, the count matrices $D_{mk}$ and $W_{vk}$ are updated based on the new counts resulting from the new probabilities for $z_{ij}$.

Accordingly, after initialization, the "sampler" function samples T times, in turn, all of the latent variables by calling "draw_z" and the $\phi$ values and $\theta$ values by calling the appropriate "estimate" function. It is assumed that the given "topics" matrix has been initialized with a random assignment of topics.

```
// T is the number of samples
// D is the number of samples drawn densely
// Returns the matrix phi
procedure sampler (int T, int D): float [V][K] {
    // Initialization
    estimate_phi ( )
    estimate_theta ( )
    // For every sample
    for i = 0 to T
        // Clear statistics matrices
        set topics_per_doc to 0
        set words_per_topic to 0
        set words_total to 0
        // Amount of probability mass assigned to hyperparameters
        // S is defined one iteration before being used
        int S
        // Choose topics , densely or sparsely
        if (i <= D)
            draw_z ( )
        else
            sparse_draw_z (S)
        // Update the probability matrices, densely or sparsely.
        // Note how the switch to sparse happens for probabilities
        // evaluation one iteration before it does for the choice of topics.
        // Note also the switch back to dense evaluation at the very last round.
        if (i < D | | i == T)
            estimate_phi ( )
            estimate_theta ( )
        else
            S = pre_compute ( )
            estimate_phi_sparse ( )
            estimate_theta_sparse ( )
    return phis
}
```

Procedures "estimate_phi" and "estimate_theta" compute the probabilities based on the current statistics of topic assignments. These probabilities are stored in a dense matrix. As described in further detail below, the $\theta$ and $\phi$ matrices are represented with a dense representation during early iterations of "sampler", during which time, sampling service 124 uses the procedures "estimate_phi" and "estimate_theta" rather than "estimate_phi_sparse" and "estimate_theta_sparse".

```
procedure estimate_phi ( ) {
    for v = 0 to V - 1 in parallel
        for k = 0 to K - 1 in parallel
            float num = words_per_topic [k][v] + beta
            float den = words_total [k] + V * beta
            phis [k][v] = num / den
}
procedure estimate_theta ( ) {
    for m = 0 to M - 1 in parallel
        for k = 0 to K - 1 in parallel
            float num = topics_per_doc [m][k] + alpha
            thetas [m][k] = num / N
}
```

The procedures "estimate_phi_sparse" and "estimate_theta_sparse" also compute the probabilities based on the current statistics of topic assignments, which probabilities are stored in sparsely-represented matrices. As described in further detail below, the θ and φ matrices are converted from a dense representation to a sparse representation after the early iterations of "sampler".

```
procedure estimate_phi_sparse ( ) {
    // Create the sparsely represented matrix
    for v = 0 to V - 1 in parallel
        for k = 0 to K - 1
            if topics_per_doc [v][k] != 0
                vocab_ptr [v]++
    vocab_ptr exclusive prefix scan on vocab_ptr
    // Fill the sparsely represented matrix
    for v = 0 to V - 1 in parallel
        COUNT = 0
        for k = 0 to K - 1
            X = topics_per_doc [v][k]
            // If the count is not null , store the topic number and
            // its statistics in the sparsely represented matrix
            if X != 0
                PTR = v_ptr [v] + COUNT
                v_payload [ PTR ] = X
                v_topic_index [PTR] = k
                COUNT += 1
}
procedure estimate_theta_sparse ( ) {
    // Create the sparsely represented matrix
    for m = 0 to M - 1 in parallel
        for k = 0 to K - 1
            if topics_per_doc [m][k] != 0
                d_ptr [m ]++
    d_ptr = exclusive prefix scan on d_ptr
    // Fill the sparsely represented matrix
    for m = 0 to M - 1 in parallel
        COUNT =0
        for k = 0 to K - 1
            X = topics_per_doc [m][k]
            if (X != 0)
                PTR = d_ptr [m] + COUNT
                d_payload [ PTR ] = X * topics_b [k]
                d_payload2 [ PTR ] = X * topics [k] + topics_a [k]
                d_topic_index [PTR] = k
                COUNT += 1
    d_sums = reduce + on d_payload with segment d_ptr
}
```

The procedure "draw_z" draws values for the latent variables on each document in parallel, i.e., based on the densely-represented φ and θ matrices. For each document, "draw_z" goes over each word in sequence (because of the integration), computes the probability for every possible topic, and finally draws a value for the latent variable. Finally, the statistics are updated.

As such, the procedure "draw_z" does not take advantage of sparsity. In early iterations of the Greedy Gibbs sampler, the data does not have enough logical sparsity to utilize to decrease computations. Therefore, in these early iterations, it is more advantageous and efficient to perform the Greedy Gibbs sampler without sparsity.

```
procedure draw_z ( )
{
    for m = 0 to M - 1 in parallel
        float p[K]
        for i = 0 to N - 1
            float sum = 0;
            int current_word = words [m][i]
            int current_topic = topics [m][i]
            for ( int j = 0; j < K; j ++)
                float p_w = phis [j][ current_word ]
                float p_z = topics_per_doc [m][i] - (j ==
                    current_topic ? 1 : 0)
                sum += p_w * ( p_z + alpha )
                p[j] = sum
            float u = random ( )
            float stop = u * sum ;
            int j;
            for j = 0 to K - 1 if( stop < p[j]) break
            topics [m][i] = j
            atomically increment words_per_topic [j][ current_word ]
            atomically increment words_total [j]
            topics_per_doc [m][j] += 1
            topics_per_doc [m][ current_topic ] -= 1
}
```

The procedure "pre_compute" computes values, for each topic, that are not dependent on document or word information. Sampling service 124 uses one or more of the values computed in "pre_compute" to evaluate each of formulas 820, 830, and 840 of FIG. 8.

```
procedure pre_compute ( )
{
    for k = 0 to K - 1 in parallel
        float v = 1.0 / ( beta * |V| + words_total [k])
        topics_s [k] = v
        topics_a [k] = v * alpha
        topics_b [k] = v * beta
        topics_ab [k] = v * alpha * beta
}
```

The procedure "sparse_draw_z" draws values for the latent variables on each document in parallel, i.e., using the sparsely-represented φ and θ matrices. "Sparse_draw_z" does so while taking into account the sparsity of the data in order to reduce the amount of computation.

In "sparse_draw_z", the value of q is calculated prior to assigning a topic for the word in question. The calculation of q is technically difficult. Based on formula 840 of FIG. 8, the value of q only need be calculated when $W_{vt}$ is non-zero. Furthermore, calculation of q is simplified if the value of θ for topic t and the given document is zero. However, accessing a particular θ value in a sparsely-represented θ matrix is relatively expensive, and it would speed up calculations if the θ value is accessed only when non-zero.

Therefore, embodiments simplify determining whether the value of θ for topic t and the given document is zero. Specifically, a filter is established for each document, which filter can provide information indicating whether a particular topic has a non-zero θ value, i.e., for the document associated with the filter.

According to an embodiment, the filter is a bit-wise filter that includes a bit for each topic (as described in the pseudocode). When sampling service 124 calculates a q value for a particular topic for a particular document, sampling service first determines whether $W_{vt}$ is non-zero. If $W_{vt}$ is non-zero, then sampling service 124 determines whether the θ value for the particular topic and document is non-zero by indexing the bit filter for the particular document by topic number. If the bit is set, then the θ value for the particular topic is non-zero and sampling service 124 accesses the value in the sparsely-represented θ matrix.

According to another embodiment, sampling service 124 represents the filter with a Bloom filter. A Bloom filter is a probabilistic data structure that provides information as to whether a particular element is within a set of elements. With a Bloom filter, false positives are possible, but false negatives are not. Further, while a bit-wise filter includes a bit for every topic, a Bloom filter may represent whether a particular topic, among all topics being considered, has a non-zero θ value with as few as five bits. Though a Bloom filter may be wrong at times, though generally very rarely, such an error will at most cause that a θ value of zero be accessed in the θ matrix.

After the value of q is calculated in "sparse_draw_z", sampling service 124 determines whether s, r, or q will be used to draw a topic for the word in question. Specifically, in the pseudocode, the variable u is assigned a random number ("float u=random ( )") and then it is determined whether that random number falls into the range of s ("if u<S"), r ("else if u<S+R"), or q (in the subsequent "else" clause).

If s is chosen to select the topic, then sampling service 124 initializes ACC with a zero value, and then increments ACC by the value in "topics_ab" for each topic k, in turn. The array "topics_ab" includes the pre-computed values of s, as calculated based on formula 820 of FIG. 8, for each topic k. Once the value of ACC is greater than or equal to the value of the random number u, then the current topic k is chosen as the topic for the word in question.

Similarly, if r is chosen to select the topic, then sampling service 124 initializes ACC with the value of S (which represents the total amount of probability mass assigned to hyperparameters), and then increments ACC by the value in the array "d_payload" for each non-trivial θ value for the given document. Of course, this process is simplified by the inclusion of only non-trivial θ values in the array "d_payload". Once the value of ACC is greater than or equal to the value of the random number u, then the current topic (as discovered by "d_topics[D_PTR+k]") is chosen as the topic for the word in question.

If q is chosen to select the topic, then sampling service 124 initializes ACC with the value of S+R (which represents the total amount of probability mass assigned to the θ probabilities for the current document), and then increments ACC by the value in the array "v_payload" for each non-trivial φ value for the given word. Again, this process is simplified by the inclusion of only non-trivial φ values in the array "v_payload". Once the value of ACC is greater than or equal to the value of the random number u, then the current topic (as discovered by "v_topics[V_PTR+k]") is chosen as the topic for the word in question.

To illustrate the value of ACC becoming greater than or equal to the value of the random number u when r is chosen to pick the topic for the given word, on a particular iteration, ACC is initialized to 4.6, and u is 4.7. The θ value for the first topic represented in the array "d_payload" for document m (e.g., where m=43) is 0.2. The value of ACC is incremented by that θ value for the first topic, which brings ACC to 4.8. At this point, the value of ACC is greater than the value of u. Therefore, the topic at d_topic_index[43] (i.e., topic 7) is the topic that is picked for word i in document m.

```
procedure sparse_draw_z ( float S)
{
    // for each document
    for m = 0 to M – 1 in parallel
        // Pointer to the document in the sparsely represented matrix
        D_PTR = d_ptr [m]
        // Number of non -trivial elements in this document
        D_COUNT = d_ptr [m + 1] – d_ptr [m]
        // Total amount of mass assigned to the theta probabilities for
        this document
        float R = d_sums [m]
        bit filter [K]
        set filter to 0
        // For each topic in the sparse representation of document m
        // remember it is not null
        for i = 0 to D_COUNT
            filter [ d_topic_index [ D_PTR + i]] = 1
        // For each word in document m
        for i = 0 to N – 1
            float Q = 0;
            int current_word = words [m][i]
            // Pointer to the words in the sparsely represented matrix
            int V_PTR = v_ptr [ current_word ]
            // Number of non -trivial topics for this word
            int V_COUNT = v_ptr [v + 1] – v_ptr [v]
            // For each topic with non-trivial topic per word probability
            // Finish the computation of the payload and compute Q
            for j = 0 to V_COUNT
                // t is the topic identifier
                int t = v_topic_index [ V_PTR + j]
                // Is topic t in document m not trivial?
                if ( filter [t]) {
                    // This is the most complicated case.
                    // The pseudocode is working on word w at
                    // position i in document m, going through all non
                    //-trivial topics k (i.e., the topics for which w has
                    a non -null count)
                    // Now , the filter indicates that the probability of
                    // topic k in document m is also non -trivial , so
                    // there is need to scan the sparsely represented
                    theta matrix to find this probability.
                    for kp = 0 to D_COUNT
                        if (t == d_topics_index [ D_PTR + j]) {
                            float q = pre_q * docs_payload2 [k]
                            vocab_payload [ V_PTR + j] = q
                            Q += q
                            break
                        }
                } else {
                    float q = pre_q * topics_a [t]
                    v_payload [ V_PTR + j] = q
                    Q += q
                }
            float u = random ( )
            float stop = u * (S + R + Q)
            int j
            // The following statement draws the topic
            // It replaces the statement: for j = 0 to K – 1 if(stop < p[j])
            break
            if u < S {
                float ACC = 0
                for k = 0 to K – 1
                    ACC += topics_ab [k]
                    if u <= ACC
                        j = k
                        break
            } else if u < S + R {
                float ACC = S
                for k = 0 to D_COUNT
                    ACC += d_payload [ D_PTR + k]
                    if u <= ACC
                        j = d_topics [ D_PTR + k]
                        break
            } else {
                float ACC = S + R
                for k = 0 to V_COUNT
                    ACC = v_payload [ V_PTR + k]
                    if u <= ACC
                        j = v_topics [ V_PTR + k]
                        break
            }
}
```

```
    topics [m][i] = j
    atomically increment words_per_topic [j][ current_word ]
    atomically increment words_total [j]
    topics_per_doc [m][j ]++
    topics_per_doc [m][ current_topic ]--
}
```

Results of the Greedy Gibbs Sampler

Again returning to flowchart 300, at step 308, one or more sets of correlated words are determined from results of running the Greedy Gibbs sampler over the Dirichlet distribution; wherein the one or more sets of correlated words comprises words from the plurality of words. For example, sampling service 124 continues to run the Greedy Gibbs sampler over the data in document set 142 until a satisfactory level of convergence is detected. A satisfactory level of convergence may be detected based on one or more of: a number of iterations of the Greedy Gibbs sampler (i.e., T in the pseudocode), the likelihood of the parameters does not increase significantly anymore, the perplexity of the parameters does not decrease anymore, etc.

Once convergence is reached, sampling service 124 has, through the Greedy Gibbs sampler, assigned each word of the plurality of words in each document of document set 142 a particular topic. According to an embodiment, the plurality of words is less than all of the words in the documents of document set 142. According to an embodiment, the plurality of words is all of the words in the documents of document set 142. According to embodiments, sampling service 124 returns, to sampling client 112, information for K number of lists of correlated words identified from document set 142.

According to an embodiment, the sets of correlated words are not automatically associated with topic names, interpretations of the identified correlations, etc. Specifically, the word groupings are based on correlations that were automatically detected in the given set of documents via the Greedy Gibbs sampler. For example, sampling service 124 identifies a correlation between two words based on the inclusion of the two words together in a single document of document set 142. In a similar vein, sampling service 124 identifies a strong correlation between the two words based on the inclusion of the two words together in each of multiple documents. As a further example, sampling service 124 identifies a strong correlation between the two words based on the inclusion of two words together in the same sentence in one or more of the documents.

Running the Greedy Gibbs Sampler on a GPU: Dense and Sparse Matrices

To further increase the running speed of the Greedy Gibbs sampler described herein, the sampler may be run on a highly-parallel processing unit, such as a GPU, which can take advantage of the parallelism inherent in a Gibbs sampler with at least one non-collapsed variable. According to embodiments, a Greedy Gibbs sampler can be configured to take advantage of the functionality of a GPU using an implementation that combines densely-represented matrices and sparsely-represented matrices.

Generally, only a relatively small strict subset of the total number of topics being analyzed by a Greedy Gibbs sampler will be assigned to words in a given document of a corpus being analyzed. A strict subset of a set is a subset with less members than the set. Similarly, only a relatively small strict subset of the total number of topics being analyzed by a Greedy Gibbs sampler will be assigned to any given word in a corpus being analyzed. As such, densely-represented "topics_per_doc" and "words_per_topic" matrices would be logically sparse, which means that many of the counts in these matrices would be zero.

For example, sampling service 124 runs a Greedy Gibbs sampler over document set 142 to identify 100 sets of correlated words from document set 142. At a particular iteration of the Greedy Gibbs sampler, sampling service 124 identifies five topics, out of the 100 topics, to assign to words in a particular document of document set 142. As such, the identified five of the 100 topics will have non-zero values in the matrix "topics_per_doc" for the particular document, while the rest of the 100 topics will have a zero value for the particular document.

As a further example, while running the Greedy Gibbs sampler, sampling service 124 determines that a particular word from the vocabulary of document set 142 is correlated to three of the 100 topics with any degree of probability. As such, the matrix "words_per_topic" will include non-zero values for the identified three topics, for the particular word, and will include a zero value for the rest of the topics for the particular word.

Independent from whether a matrix is logically sparse or not, a matrix can be represented with a sparse matrix representation or a dense matrix representation. For a sparsely-represented matrix, the matrix representation only stores all non-zero values from the matrix. For example, for a sparsely-represented phi matrix, only the non-zero probabilities are represented in the matrix and all probabilities equal to zero may be inferred from the representation (but these zero values are not explicitly stored in the matrix representation). For a densely-represented matrix, the matrix representation stores all values for the matrix (zero and non-zero alike).

Sparse Representation of a Matrix

A sparsely-represented matrix may be represented using any mechanism that allows a matrix to be represented without explicit representation of zero values in the matrix. For example, compressed sparse column representation or compressed sparse row representation may be used to sparsely-represent a matrix. "Sampler" utilizes compressed sparse column (CSC) representation to sparsely-represent matrices.

CSC utilizes three arrays. Firstly, a Doc_Pointer array (i.e., "d_ptr" and "v_ptr" in "sampler") represents the index of the matrix. The Doc_Pointer array includes one cell per document in document set 142, is indexed by the document identifier number, and stores information used to identify where information for that particular document is stored in the other two arrays. "Sampler" creates the Doc_Pointer arrays needed for the sparsely-represented $\theta$ and $\phi$ matrices in the two portions of the pseudocode that indicate "//create the sparsely-represented matrix".

To illustrate in the context of the $\theta$ matrix, "sampler" records in "d_ptr" how many non-zero count values are there from $D_{mk}$, for each particular doc m. The exclusive prefix scan sums all of the count values to result in a "d_ptr" array storing, at each cell, the sum of all of the previous count values. Thus, if the count values in "d_ptr" are 1, 0, 1, 1, 2, then the resulting values in "d_ptr" after the exclusive prefix scan will be 1, 1, 2, 3, 5. The resulting values in "d_ptr" array indicate where to look in the other two CSC arrays for information on each document m.

Secondly, a Topic_Index array (i.e., "d_topic_index" and "v_topic_index" in "sampler") stores topic identifiers to identify which topics correspond to the probabilities in a Payload array. Thirdly, the Payload array (i.e., "d_payload" and "v_payload" in "sampler") includes all of the non-zero values for the sparsely-represented matrix. The Topic_Index and Payload arrays will be of the same length.

Thus, to get information out of a CSC representation of a $\theta$ matrix, sampling service 124 indexes the Doc_Pointer ("d_ptr") array by document number to retrieve the index into the Payload ("d_payload") and Topic_Index ("d_topic_index") arrays at which location is stored information for $\theta$ values for the referred-to document. Starting at the retrieved index, sampling service 124 retrieves, from the Payload array, the one or more non-zero $\theta$ values for the particular document, and retrieves corresponding topic identifiers from the same locations in the Topic_Index array.

For example, to retrieve the $\theta$ values for a document 12, sampling service 124 indexes the "d_ptr" array at index 12, which produces the value 43. The $\theta$ values for document 12 are located in the "d_payload" array starting at index 43. Sampling service 124 determines that document 12 includes two values in "d_payload". Therefore, sampling service 124 can retrieve the $\theta$ values for a document 12 in "d_payload" at indexes 43 and 44, which produce the values 0.2 and 0.8, respectively. Furthermore, sampling service 124 can retrieve the topic identifiers that correspond to the retrieved $\theta$ values in "d_topic_index" at the same indexes 43 and 44, which produce the values 7 and 9, respectively. Therefore, for document 12, topic 7 has the probability 0.2, and topic 9 has the probability 0.8.

Running a Gibbs Sampler Using Densely- and Sparsely-Represented Matrices

FIG. 9 depicts a flowchart 900 for running a Greedy Gibbs sampler that computes probabilities of assigning topics to words from a set of documents based on both of densely-represented matrices and sparsely-represented matrices.

At step 902, information is received for a set of documents, i.e., document set 142 (database 140), where the set of documents comprises a plurality of words, and wherein a particular document of the set of documents comprises a particular word of the plurality of words. For example, a user provides information about document set 142, including textual documents as described above, to sampling client 112 (client device 110). Sampling client 112 provides the information to sampling service 124 (server device 120).

At step 904, a Greedy Gibbs sampler is run over a Dirichlet distribution of the plurality of words in the set of documents. For example, sampling service 124 runs a Greedy Gibbs sampler over a Dirichlet distribution of a plurality of words in document set 142.

At step 906, running a Greedy Gibbs sampler over a Dirichlet distribution of the plurality of words comprises computing probabilities of one or more topics, of a plurality of topics, assigned to the particular word in the particular document based, at least in part, on both of: (a) one or more densely-represented matrices, and (b) one or more sparsely-represented matrices.

For example, according to embodiments, the matrices representing the $\phi$ and $\theta$ values (referred to herein as the $\phi$ and $\theta$ matrices) are sparsely-represented matrices for at least some of the iterations of "sampler". Since these matrices drive the drawing of topics to assign to words, a sparse representation of these matrices facilitates sampling service 124 skipping performance of any topic assignment calculations for zero $\phi$ or $\theta$ values. This reduction of computations during the assignment of topics to words significantly speeds up the time it takes for the Greedy Gibbs sampler to draw topic assignments.

According to embodiments, the $\phi$ and $\theta$ matrices are initially densely-represented matrices and eventually sampling service 124 converts the representation of the $\phi$ and $\theta$ matrices to a sparse representation. At the beginning stages of running a Greedy Gibbs sampler, the $\phi$ and $\theta$ matrices will not include many zero values. For a matrix with few zero values, it is more expensive to represent the matrix with a sparse representation than to represent the matrices densely and perform all computation for all values during topic assignments to words. At some point (i.e., represented by the variable D in "sampler"), sampling service 124 switches the representation of the $\phi$ and $\theta$ matrices from dense representation to sparse representation to take advantage of the increasing logical sparsity in the matrices as sampling service 124 iterates through the Greedy Gibbs sampler.

According to embodiments, the count matrices representing words per topic and topics per document are represented with dense matrix representations. Representing these count matrices with a dense representation allows for a GPU to easily access and write values to the matrices, i.e., using SIMD memory accesses. Thus, this dense representation reduces GPU write time when calculating the counts needed to assign topics to words.

Runtime Performance

To assess the statistical and runtime quality of the sparse and data-parallel Gibbs sampler, the inference is run for different values of D. In one case, D equals T and all of the inference is done using densely represented matrices. In one case, D equals 1 and all of the inference is done using sparsely represented matrices. Finally, D is set up so that 40% of the inference is done with densely represented matrices.

$$pt(\theta, \phi \mid w) = \sum_{z=1}^{K} \prod_{i=1}^{M} \prod_{j=1}^{N_i} Cat(w_{ij} \mid \phi_z) Cat(z \mid \theta_i)$$

Figure 10:
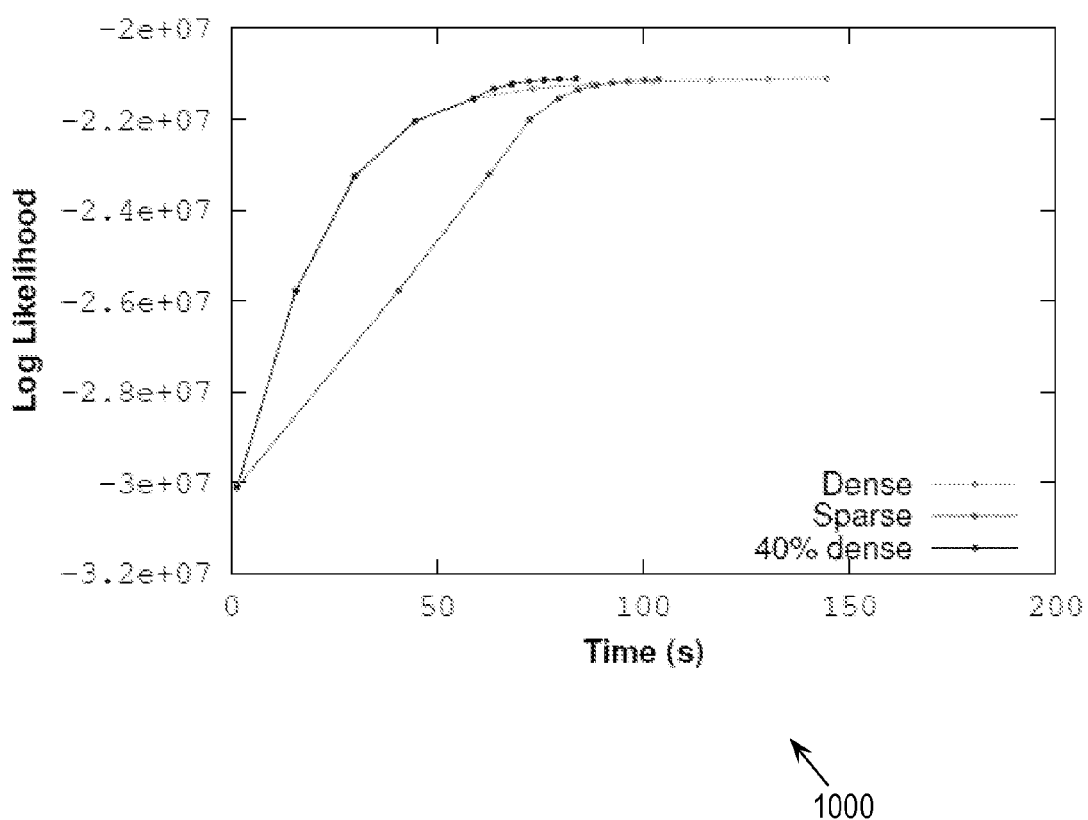
FIG. 10 depicts a chart showing how the log likelihood evolves over time.

The results presented in chart 1000 of FIG. 10 comprise a comparison of the statistical performance of different Gibbs samplers for LDA, and are from experiments run on a subset of Wikipedia.

These results show how the log likelihood evolves over time, and plots the different samples. Chart 1000 indicates that the fully sparse implementation, once it is close to convergence, can indeed sample much faster than a fully dense implementation. However, a dense implementation has a much better learning curve for the first few iterations. The hybrid implementation benefits from both by switching from dense to sparse representation during the learning, thus learning quickly in the early iterations by using the dense methods, then switching over to the sparse method so that later iterations run faster.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
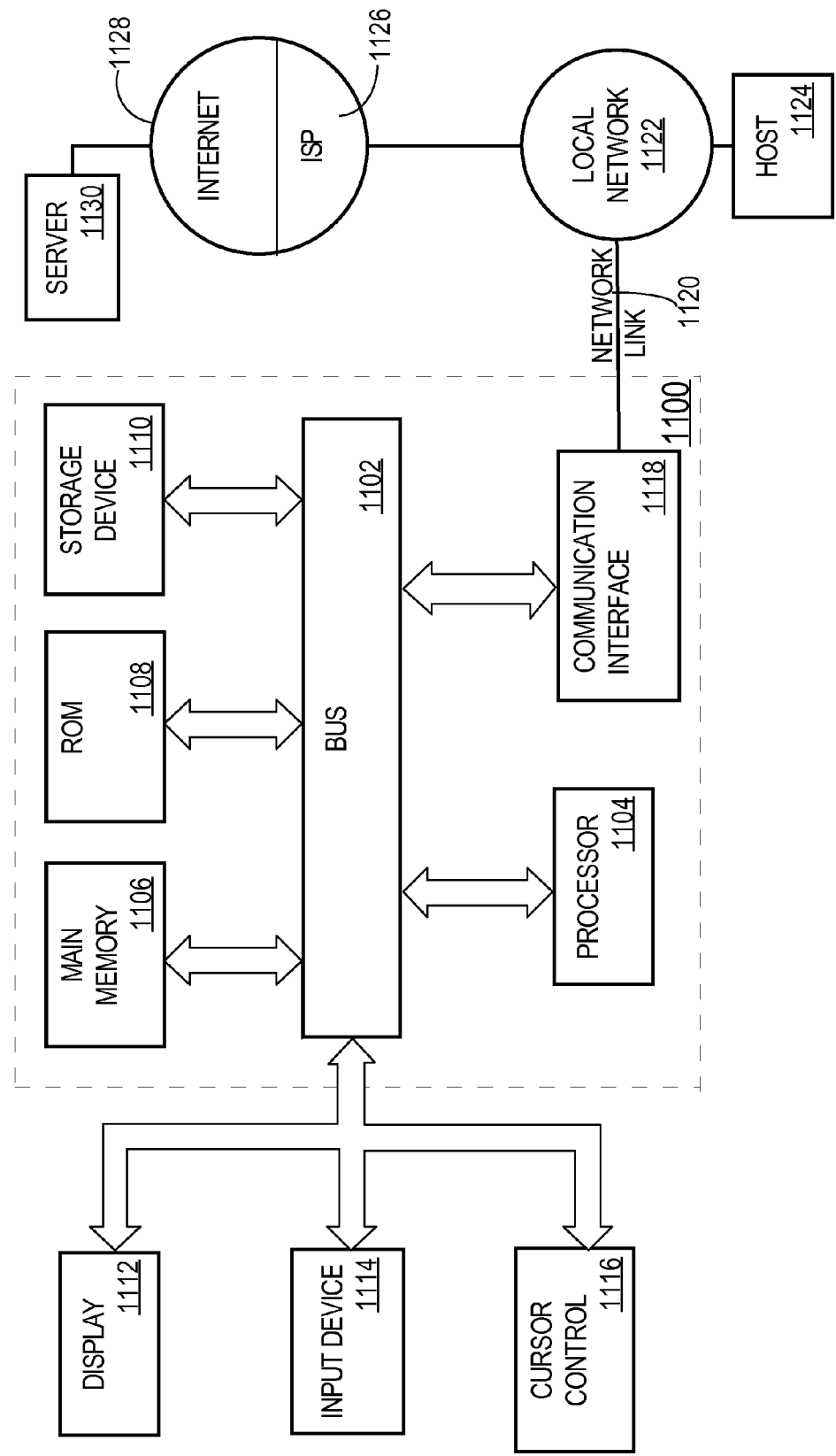
FIG. 11 is a block diagram of a computer system on which embodiments may be implemented.

For example, FIG. 11 is a block diagram that illustrates a computer system 1100 upon which an embodiment may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for identifying sets of correlated words comprising:
    receiving information for a set of documents;
    wherein the set of documents comprises a plurality of words;
    wherein a particular document of the set of documents comprises a particular word of the plurality of words;
    running a Greedy Gibbs sampler over a Dirichlet distribution of the plurality of words, comprising:
        computing probabilities of one or more topics, of a plurality of topics, for the particular word in the particular document based, at least in part, on a probability mass for one of: hyperparameters, the particular document, or the particular word;
    determining, from results of running the Greedy Gibbs sampler over the Dirichlet distribution, one or more sets of correlated words;
    wherein the one or more sets of correlated words comprises words from the plurality of words; and
    wherein the method is performed by one or more computing devices.

2. The method of claim 1, wherein the Greedy Gibbs sampler has at least one non-collapsed variable.

3. The method of claim 1, wherein running the Greedy Gibbs sampler over the Dirichlet distribution of the plurality of words, further comprises:
    prior to computing the probabilities of the one or more topics, calculating the probability mass for at least one of: hyperparameters, the particular document, or the particular word;
    wherein calculating the probability mass for at least one of hyperparameters, the particular document, or the particular word is based, at least in part, on calculating a mean of the Dirichlet distribution.

4. The method of claim 1, wherein computing the probabilities of the one or more topics further comprises:
    computing a probability of a particular topic of the plurality of topics for the particular word in the particular document based, at least in part, on the probability mass for the particular document;
    wherein computing the probability of the particular topic for the particular word in the particular document comprises determining that the probability of the particular topic for the particular word in the particular document is zero based on the probability mass for the particular document being zero.

5. The method of claim 1, wherein computing the probabilities of the one or more topics further comprises:
    computing a probability of a particular topic of the plurality of topics for the particular word in the particular document based, at least in part, on the probability mass for the particular word;
    wherein computing the probability of the particular topic for the particular word in the particular document comprises determining that the probability of the particular topic for the particular word in the particular document is zero based on the probability mass for the particular word being zero.

6. A method for identifying sets of correlated words comprising:
    receiving information for a set of documents;
    wherein the set of documents comprises a plurality of words;
    wherein a particular document of the set of documents comprises a particular word of the plurality of words;
    running a Greedy Gibbs sampler over a Dirichlet distribution of the plurality of words, further comprising:
        computing probabilities of one or more topics, of a plurality of topics, being assigned to the particular word in the particular document based, at least in part, on both of: (a) one or more densely-represented matrices, and (b) one or more sparsely-represented matrices;
    determining, from results of running the Greedy Gibbs sampler over the Dirichlet distribution, one or more sets of correlated words;
    wherein the one or more sets of correlated words comprises words from the plurality of words; and
    wherein the method is performed by one or more computing devices.

7. The method of claim 6, wherein both a matrix that represents topics per document and a matrix that represents words per topic are densely-represented matrices.

8. The method of claim 6, wherein both a matrix representing phi values and a matrix representing theta values are sparsely-represented matrices.

9. The method of claim 8, wherein:
    a particular topic, of the one or more topics, corresponds to a particular non-zero value in one of: the matrix representing the phi values, or the matrix representing the theta values; and
    computing the probabilities of the one or more topics being assigned to the particular word in the particular document comprises: computing a probability of the particular topic being assigned to the particular word based on inclusion of the particular non-zero value in a sparsely-represented matrix.

10. The method of claim 6, wherein:
    the one or more sparsely-represented matrices are one or more particular matrices represented as sparsely-represented matrices; and
    the method further comprises:
        prior to computing probabilities of the one or more topics, of the plurality of topics, being assigned to the particular word in the particular document:
            representing a certain matrix of the one or more particular matrices as a densely-represented matrix;
            computing topic probabilities based, at least in part, on the densely-represented certain matrix;
        after computing topic probabilities based, at least in part, on the densely-represented certain matrix:
            converting representation of data in the certain matrix from a dense representation of the data to a sparse representation of the data to produce a sparsely-represented certain matrix; and
            after converting the representation of the data in the certain matrix, computing probabilities of the one or more topics, of the plurality of topics, being assigned to the particular word in the particular document based, at least in part, on the sparsely-represented certain matrix.

11. The method of claim 6, wherein computing the probabilities of the one or more topics, of the plurality of topics, being assigned to the particular word in the particular document further comprises:
  determining, based on a filter that is specific to values for the particular document, whether a non-zero theta value, for a particular topic and for the particular document, is included in a theta matrix; and
  in response to determining that a non-zero theta value, for the particular topic and for the particular document, is included in the theta matrix, retrieving the non-zero theta value from the theta matrix.

12. The method of claim 11, wherein the filter is implemented with a Bloom filter.

13. One or more non-transitory computer-readable media storing instructions which, when executed by one or more processors, cause performance of identifying sets of correlated words comprising:
  receiving information for a set of documents;
  wherein the set of documents comprises a plurality of words;
  wherein a particular document of the set of documents comprises a particular word of the plurality of words;
  running a Greedy Gibbs sampler over a Dirichlet distribution of the plurality of words, comprising:
    computing probabilities of one or more topics, of a plurality of topics, for the particular word in the particular document based, at least in part, on a probability mass for one of: hyperparameters, the particular document, or the particular word;
  determining, from results of running the Greedy Gibbs sampler over the Dirichlet distribution, one or more sets of correlated words;
  wherein the one or more sets of correlated words comprises words from the plurality of words.

14. The one or more non-transitory computer-readable media of claim 13, wherein the Greedy Gibbs sampler has at least one non-collapsed variable.

15. The one or more non-transitory computer-readable media of claim 13, wherein running the Greedy Gibbs sampler over the Dirichlet distribution of the plurality of words, further comprises:
  prior to computing the probabilities of the one or more topics, calculating the probability mass for at least one of: hyperparameters, the particular document, or the particular word;
  wherein calculating the probability mass for at least one of hyperparameters, the particular document, or the particular word is based, at least in part, on calculating a mean of the Dirichlet distribution.

16. The one or more non-transitory computer-readable media of claim 13, wherein computing the probabilities of the one or more topics further comprises:
  computing a probability of a particular topic of the plurality of topics for the particular word in the particular document based, at least in part, on the probability mass for the particular document;
  wherein computing the probability of the particular topic for the particular word in the particular document comprises determining that the probability of the particular topic for the particular word in the particular document is zero based on the probability mass for the particular document being zero.

17. The one or more non-transitory computer-readable media of claim 13, wherein computing the probabilities of the one or more topics further comprises:
  computing a probability of a particular topic of the plurality of topics for the particular word in the particular document based, at least in part, on the probability mass for the particular word;
  wherein computing the probability of the particular topic for the particular word in the particular document comprises determining that the probability of the particular topic for the particular word in the particular document is zero based on the probability mass for the particular word being zero.

18. One or more non-transitory computer-readable media storing instructions which, when executed by one or more processors, cause performance of steps for identifying sets of correlated words comprising:
  receiving information for a set of documents;
  wherein the set of documents comprises a plurality of words;
  wherein a particular document of the set of documents comprises a particular word of the plurality of words;
  running a Greedy Gibbs sampler over a Dirichlet distribution of the plurality of words, further comprising:
    computing probabilities of one or more topics, of a plurality of topics, being assigned to the particular word in the particular document based, at least in part, on both of: (a) one or more densely-represented matrices, and (b) one or more sparsely-represented matrices;
  determining, from results of running the Greedy Gibbs sampler over the Dirichlet distribution, one or more sets of correlated words;
  wherein the one or more sets of correlated words comprises words from the plurality of words.

19. The one or more non-transitory computer-readable media of claim 18, wherein both a matrix that represents topics per document and a matrix that represents words per topic are densely-represented matrices.

20. The one or more non-transitory computer-readable media of claim 18, wherein both a matrix representing phi values and a matrix representing theta values are sparsely-represented matrices.

21. The one or more non-transitory computer-readable media of claim 20, wherein:
  a particular topic, of the one or more topics, corresponds to a particular non-zero value in one of: the matrix representing the phi values, or the matrix representing the theta values; and
  computing the probabilities of the one or more topics being assigned to the particular word in the particular document comprises: computing a probability of the particular topic being assigned to the particular word based on inclusion of the particular non-zero value in a sparsely-represented matrix.

22. The one or more non-transitory computer-readable media of claim 18, wherein:
  the one or more sparsely-represented matrices are one or more particular matrices represented as sparsely-represented matrices; and
  the instructions further comprise instructions which, when executed by one or more processors, cause:
    prior to computing probabilities of the one or more topics, of the plurality of topics, being assigned to the particular word in the particular document:

representing a certain matrix of the one or more particular matrices as a densely-represented matrix;

computing topic probabilities based, at least in part, on the densely-represented certain matrix;

after computing topic probabilities based, at least in part, on the densely-represented certain matrix:

converting representation of data in the certain matrix from a dense representation of the data to a sparse representation of the data to produce a sparsely-represented certain matrix; and after converting the representation of the data in the certain matrix, computing probabilities of the one or more topics, of the plurality of topics, being assigned to the particular word in the particular document based, at least in part, on the sparsely-represented certain matrix.

23. The one or more non-transitory computer-readable media of claim 18, wherein computing the probabilities of the one or more topics, of the plurality of topics, being assigned to the particular word in the particular document further comprises:

determining, based on a filter that is specific to values for the particular document, whether a non-zero theta value, for a particular topic and for the particular document, is included in a theta matrix; and in response to determining that a non-zero theta value, for the particular topic and for the particular document, is included in the theta matrix, retrieving the non-zero theta value from the theta matrix.

24. The one or more non-transitory computer-readable media of claim 23, wherein the filter is implemented with a Bloom filter.

* * * * *